(12) United States Patent
Boustead et al.

(10) Patent No.: US 8,403,751 B2
(45) Date of Patent: Mar. 26, 2013

(54) APPARATUSES AND METHODS FOR USE IN CREATING AN AUDIO SCENE

(75) Inventors: Paul Boustead, Figtree (AU); Farzad Safaei, Mount Kiera (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 992 days.

(21) Appl. No.: 12/513,892

(22) PCT Filed: Nov. 8, 2007

(86) PCT No.: PCT/AU2007/001712
§ 371 (c)(1),
(2), (4) Date: May 7, 2009

(87) PCT Pub. No.: WO2008/055305
PCT Pub. Date: May 15, 2008

(65) Prior Publication Data
US 2010/0049346 A1    Feb. 25, 2010

(30) Foreign Application Priority Data

Nov. 8, 2006   (AU) .............................. 2006906213

(51) Int. Cl.
*A63F 9/24*    (2006.01)
(52) U.S. Cl. .......................................... 463/35; 463/40
(58) Field of Classification Search ................ 463/35, 463/40, 41, 42; 370/252, 254, 260
See application file for complete search history.

(56) References Cited

U.S. PATENT DOCUMENTS 6,175,842 B1   1/2001  Kirk
2006/0025216 A1 *  2/2006  Smith ............................. 463/35
2007/0036175 A1 *  2/2007  Zimmermann et al. ...... 370/467

FOREIGN PATENT DOCUMENTS

| JP | H03-089700 | 4/1991 |
| JP | 2004-267433 | 9/2004 |
| JP | 2004-298373 | 10/2004 |
| JP | 2006-094315 | 4/2006 |
| RU | 2189119 | 9/2002 |
| WO | 2005/101897 | 10/2005 |

OTHER PUBLICATIONS

Russian Office Action for Application No. 2009121548 dated Aug. 2011.
Boustead et al.: 'Comparison of Delivery Architectures for Immersive Audio in Crowded Networked Games' Proceedings of the 14th International Workshop on Network and Operating Systems Support for Digital Audio and Video, NOSSDAV'04 Jun. 16, 2004-Jun. 18, 2004, pp. 22-27.
Jing Wang et al, "An Evaluation of a Cost Metric for Selecting Transitions beteen Motion Segments", "Eurographics/SIGGRAPH Symposium on Computer Animation, 2003".
Que, et al., "Rendering Models for Immersive Voice Communications within Distributed Virtual Environment" IEEE Xplore, downloaded on Nov. 5, 2009.
Dowlatshahi, et al., "Multipoint Interactive Communication for Peer to Peer Environments" IEEE Communications Society in the ICC 2006 proceedings, pp. 317-322.

* cited by examiner

*Primary Examiner* — David L Lewis
*Assistant Examiner* — Robert Mosser

(57) ABSTRACT

An audio scene is created for an avatar in a virtual environment of multiple avatars. A link structure is created between the avatars. An audio scene is created for each avatar, based on an avatar's associations with other linked avatars.

9 Claims, 6 Drawing Sheets

APPARATUSES AND METHODS FOR USE IN CREATING AN AUDIO SCENE

FIELD OF THE INVENTION

The present invention relates generally to the field of immersive audio communications and more particularly, but by no means exclusively, to creating an immersive audio scene in a peer to peer environment.

BACKGROUND OF THE INVENTION

There have been significant advances in creating visually immersive virtual environments in recent years. These advances have resulted in the widespread uptake of massively multi-player role-playing games, in which participants can enter a common virtual environment (such as a battlefield) and are represented in the virtual environment by an avatar, which is typically in the form of an animated character.

The widespread uptake of visually immersive virtual environments is due, in part, to significant advances in both image processing technology enabling highly detailed and realistic graphics to be generated in the virtual environment and the development of three-dimensional sounds cards employing high speed processing units. A major drawback with these environments, however, is that current inter-player communication mechanisms are primitive—usually involving text chat or walkie-talkie voice communications. Embedding a more natural communications environment where voices appear to come from the avatars in the virtual world corresponding to the player is complex to implement and expensive to deliver. The audio generated by each player participating in the virtual environment must be sent to each and every other player that is within hearing range. For massively multi-player games, both the upstream and downstream bandwidth requirements for facilitating such an audio exchange may be particularly high.

Moreover, the CPU cost required to render all of the received audio streams is high, requiring particularly powerful processing units to be employed in order to meet the minimum hardware requirements for participating in the virtual environment.

Definitions

The following provides definitions for various terms used throughout this specification:

Audio Scene—audio information comprising combined sounds (for example, voices belonging to other avatars and other real-time sources of sound within the virtual environment) that are spatially placed and optionally attenuated according to a distance between a source and recipient of the sound. An audio scene may also comprise sound effects that represent the acoustic characteristics of the environment.

SUMMARY OF THE INVENTION

In a first aspect of the present invention there is provided a method of creating an audio scene for an avatar in a virtual environment including a plurality of avatars, the method comprising the steps of creating a link structure between the plurality of avatars; and rendering an audio scene for each avatar based on its association with other linked avatars.

Advantageously, aspects of the present invention provide a low-bandwidth technique for delivering immersive audio scenes by utilising a linked, peer-to-peer type structure. Delivering the service in such a manner eliminates the requirement to send real-time traffic through a central server. This has significant cost savings as large server farms and bandwidth costs are ordinarily required to deliver such a service. Instead, in accordance with aspects of the present invention, the service may be delivered using CPU resources and bandwidth of the peers (or linked avatars) using the service. In addition, the service delivery can easily be scaled as the number of avatars in the virtual environment grows because each newly linked avatar adds resources to support the service.

In accordance with a second aspect there is provided a computer program comprising at least one instruction for controlling a computer to implement a method in accordance with the first aspect of the invention.

In accordance with a third aspect there is provided a computer readable medium providing a computer program in accordance with the second aspect of the invention.

In accordance with a fourth aspect there is provided a user computing device arranged to perform the method steps in accordance with the first aspect of the invention.

In accordance with a fifth aspect there is provided a system arranged to create an audio scene for a virtual environment, the system comprising: a plurality of computing devices, each computing device being capable of controlling at least one avatar in the virtual environment, wherein each computing device is arranged to render an output audio scene for the at least one avatar and communicate the output audio scene to at least one other computing device.

BRIEF DESCRIPTION OF THE DRAWINGS

Notwithstanding any other forms which may fall within the scope of the present invention, an embodiment of the present invention will now be described, by way of example only, with reference to the accompanying drawings in which.

DETAILED DESCRIPTION OF PREFERRED EMBODIMENTS

Figure 1:
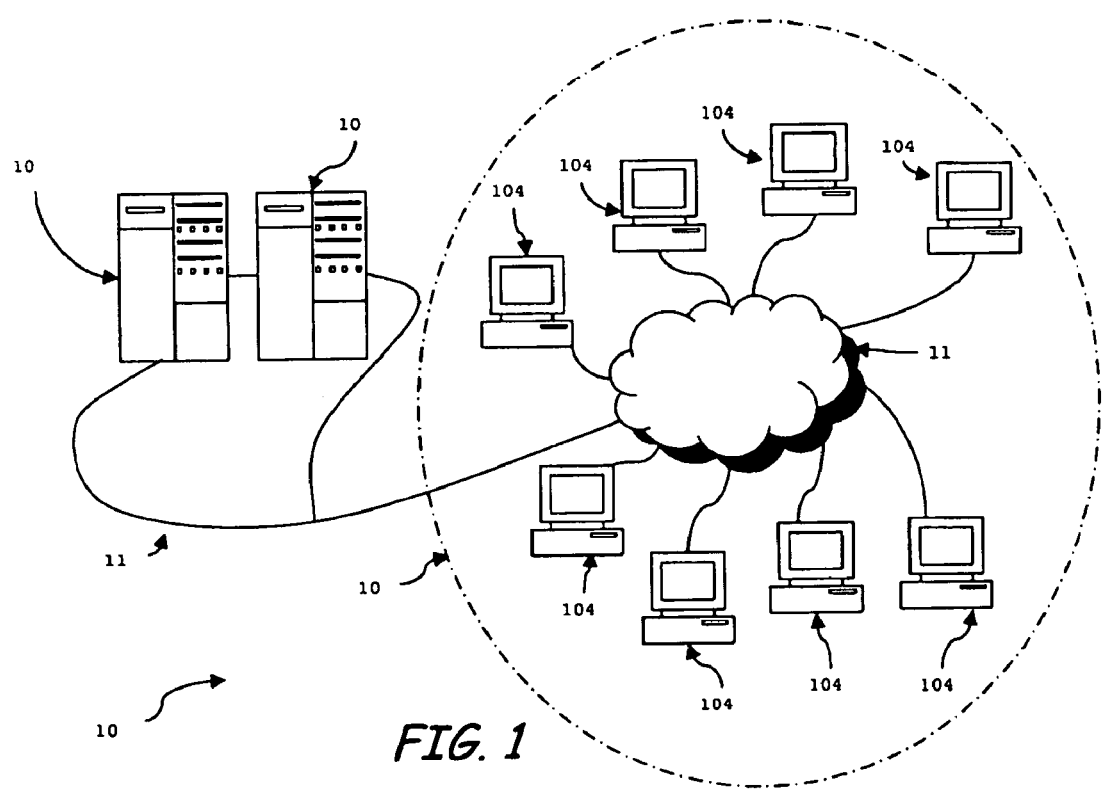
FIG. 1 is a block diagram of a system arranged to carry out an embodiment of the present invention.

With reference to FIG. 1, the system 100 includes a virtual environment server 102; control server 103; user computing devices 104; and a communication system 106.

The primary function of the virtual environment server 102 is to maintain state information for a virtual environment. In the present embodiment of the invention, the virtual environment is a battlefield of a multiplayer on-line game and the avatars represent participants (that is, users of the user computing devices 104) in the virtual environment and are in the form of animated soldiers. The state information maintained by the virtual environment server 102 comprises, for example, the position of the avatars in the virtual environment; that is, the location of the soldiers in the battlefield.

It is noted that the embodiment is not restricted to virtual environments and avatars for multi-player online games. The embodiment has application to a range of virtual environments including, for example, virtual environments in a business context (such as a virtual staff meeting) or an educational context (such as a virtual lecture).

To perform the primary functions of maintaining the state information, the virtual environment server 102 comprises computer hardware including a motherboard, central processing units, random access memory, hard disks, networking hardware and a power supply. In addition to the hardware, the virtual environment server 102 includes an operating system (such as Linux, which can be obtained from the Internet at a website located at URL http://www.redhat.com) that resides on the hard disk and which co-operates with the hardware to provide an environment in which software applications can be executed. In this regard, the hard disk of the virtual environment server 102 is loaded with a virtual environment server application (such as the Quake engine, which can be obtained from the Internet at a website located at URL http://www.idsoftware.com) for maintaining the state information.

A control server 103 is connected to the virtual environment server 102, via high speed link 105. The control server 103 incorporates the same hardware as the virtual environment server and is loaded with a control server application which is arranged to interact with the virtual environment server 102 to obtain information that identifies the various avatars present in the virtual environment, and the location of the avatars in the virtual environment. This information may also include details of the status of avatars (for example, active or inactive) and details of any dynamic sound barriers. Using algorithms embedded within the control server application, the control server 103 generates immersive audio rendering information which is communicated to each of the user computing devices. As depicted in FIG. 1, the control server 102 is also arranged to communicate with the user computing devices, via link 114.

The user computing devices 104 are in the form of laptop or desktop computers. However, it will be readily appreciated that the embodiment is not restricted to laptop or desktop communication devices. It is envisaged that in alternative embodiments of the present invention the user computing devices 104 (e.g. such as devices (04a-h, as shown) could be portable wireless communication devices such as the Nokia N-Gage and the Playstation Portable. Each user computing device 104 comprises computer hardware including a motherboard, central processing unit, random access memory, a hard disk or similar storage device, power supply, monitor and a user information input (for instance, a keyboard). In addition to the hardware, the hard disk of each user computing device 104 is loaded with an operating system capable of interacting with the hardware of the computing device 104 to provide an environment in which software applications can be executed. In this regard, the hard disk of each user computing device 104 is loaded with a virtual environment client application and an immersive audio communication client application.

The virtual environment client application is arranged to send and receive the state information for the virtual environment to and from the virtual environment server application loaded on the virtual environment server 102. The immersive audio communication client application is arranged to send and receive audio information to and from other immersive audio communication clients. It was described previously that each user computing device 104 is loaded with an operating system. The embodiment may be easily arranged to operate any different operating systems loaded on the user computing devices 104 including, for example, Microsoft Windows XP or Linux (both of which would typically be used when the computing devices 104 are in the form of a desktop computer).

The communication system 106 enables the virtual environment client application of each of the user computing devices 104 and the virtual environment server application of the virtual environment system 102 to exchange data (more specifically, the state information) with each other. The communication system 106 also enables the immersive audio communication client application of each of the user computing devices 104 and control server 103 to exchange data (more specifically, the details of a link structure in the form of a peer-to-peer graph) with each other.

To support the exchange of data, the communication system 106 includes a data network 110 in the form of the Internet for sending and receiving data from the user computing devices 104. The present invention is not restricted to being used with the Internet and an alternative embodiment of the present invention may employ, for example, an 802.11 based wireless network or the like. To enable the virtual environment system 102 and the user computing devices 104 to exchange data via the communication system 106, the virtual environment server 102 is connected to the Internet 110 via a communication link 114 in the form of a high speed data link.

The embodiment of the present invention is primarily concerned with low-bandwidth peer-to-peer techniques for providing immersive audio to users of the user computing devices 104 participating in the virtual environment. As such, the following description focuses particularly on the functionality of the control server application loaded on the control server 103 and the immersive audio communication client application loaded on each of the user computing devices 104.

As previously discussed, the control server application residing on the control server 103 is arranged to obtain information relating to the location of the avatars operating in the virtual environment from the virtual environment server application. In accordance with the embodiment described herein, the location information is in the form of three-dimensional co-ordinates (x,y,z). The control server application is additionally configured to obtain details of any static and dynamic sound barriers (hereinafter 'barrier information') which may effect the propagation of sounds within the virtual environment. Once the location information and barrier information has been obtained, the control server application performs the following actions:

(1). Calculate a tree, or a series of trees (if there are a number of disparate groupings of avatars that are not within hearing range of each other), based upon the (x,y,z) location of avatars in the virtual environment. These trees connect speaking avatars to listening avatars. The control server application may also take into account factors such as available bandwidth and reliability of the nodes (i.e. corresponding to each of the user computing devices) to determine how the tree is constructed. For example, if a node in the tree does not have a high available bandwidth, application may restrict the number of other nodes in the tree that it may connect to. If a node is unreliable (e.g. if the node has a history of high delay or packet loss) then the control server application may want to make sure it is a leaf of the tree.

(2). Introduce loops into the tree to reduce the path length between each speaker and listener to form a peer-to-peer graph. The control server application will not introduce loops which are shorter than a specified length to ensure that no positive feedback nor noticeable echoes are present in the audio stream eventually outputted by the user computing devices; and (3). Communicate the following details associated with the peer-to-peer graph to the user computing devices 104 identified in the graph:

(a) the set of avatars which a user computer device 'A' must create connections to;

(b) an attenuation value α (α corresponds to the length of a graph link) to apply to the audio streams that A will send on each of these connections; and (c) an angle θ (θ corresponds to the angle of a graph link) that the received audio streams are to be rendered at.

In relation to the function of creating tree structures (see point 1 above), any suitable tree structure could be employed. However, in the case of the present embodiment, a minimum spanning tree (MST) is employed. (It is minimum with respect to a cost metric associated with the length of the links in the tree, which is proportional to the distance between avatars in the virtual environment.)

There are two main functions performed by the immersive audio client application residing on each of the user computing devices 104. The first function is to render received audio streams to create an immersive audio scene for playback to a user of the user computing device 104. This process basically involves the user computing device 104 receiving an audio stream on each of the edges of the graph that it is connected to $\{E_1, E_2 \ldots E_n\}$ and rendering the audio stream at an angle θ specified by the immersive audio rendering information. The second function involves sending a mixed audio stream generated by the user computing device 104 to all other edge-connected user computing devices/avatars. The mixed audio stream contains a mix of both an audio stream captured by the user computer device (i.e. the client's voice) and audio streams being received on all other edges (excluding, of course, the edge along which the mixed audio stream is to be sent). Before sending the mixed audio stream it is attenuated using the attenuation value a for that particular edge, also specified by the immersive audio rendering information.

With reference to FIGS. 1 to 6, an example of a method for rendering immersive audio scenes by a user computing device will now be described.

In a first step, the virtual environment server 102 passes state information of the virtual environment to the client server application of the client server 103 for subsequent processing. Given a virtual world with N avatars ($A_1, A_2, \ldots A_N$) each controlled by clients ($C_1, C_2, \ldots C_N$). Audio samples ($V_i$) are generated by each of these N clients. A graph is constructed with F edges ($E_1, E_2, \ldots E_F$). Each of these edges has an associated angle $\theta_j$ and attenuation factor $\alpha_j$ where $0<j<=F$.

Figure 2:
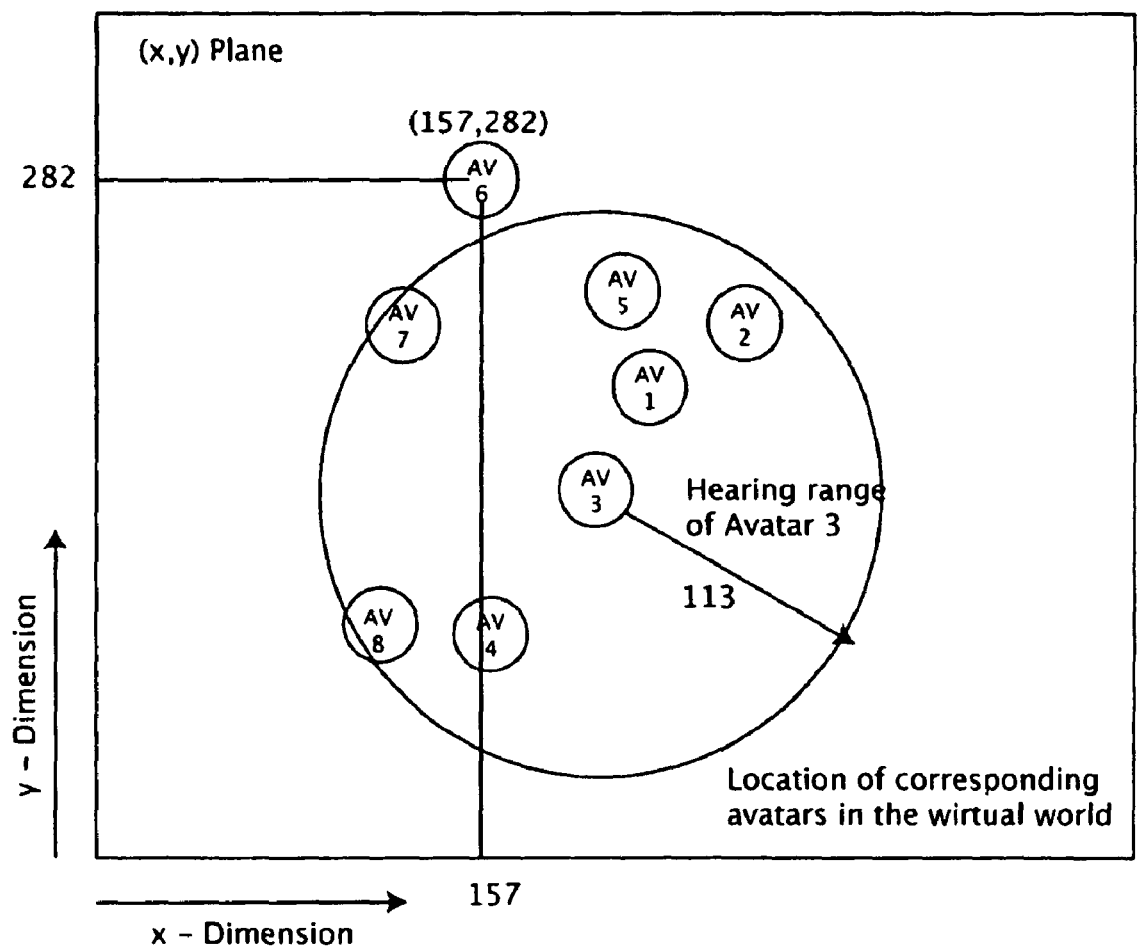
FIG. 2 shows an example of a layout of avatars in a virtual environment.

(Step 1) Place all avatars in a plane with their (x,y) coordinates corresponding to their (x,y) co-ordinates in the virtual environment as shown in FIG. 2.

(Step 2) Create a mesh connection between all nodes of the graph; if walls exist then remove any links between avatars that are on opposite sides of walls.

(Step 3) Calculate a minimum spanning tree (MST) to connect all nodes using any appropriate algorithm—such as Kruskal's algorithm.

(Step 4) Remove all links in the graph which are not part of the minimum spanning tree;

(Step 5) While loops can be added without exceeding transmission limits at the nodes and while there are possible loops that exceed a threshold (for example, two times the hearing range), then:

(a) Set min_edge_length=infinity (b) For every pair of nodes i,j that can hear each other.

(i) Calculate minimum loop distance between the two nodes as: $\min\_loop_{ij}=SP_{ij}+VD_{ij}$. Where $SP_{ij}$ is the shortest path on the tree between=i,j and $VD_{ij}$=the length of a direct link between i and j if it existed.

(ii) If min_loop$_{ij}$>the loop threshold (2×hearing_range) and $D_{ij}$<min_edge_length (1) min_edge_length=$VD_{ij}$ (2) min_edge=$\{i,j\}$ (c) Add the edge referred to by min_edge to the graph. This is the smallest edge that introduces an acceptable loop.

Now consider 7 players connected to the virtual environment. Each of the players is using a different PC connected to the Internet. Each of the players is controlling a separate avatar—these avatars are named A1 to A7. The x,y (spatial) location of these avatars in the virtual world are as shown in Table 1.

TABLE 1

X, Y Location of Avatars

|    | X   | y   |
|----|-----|-----|
| A1 | 228 | 191 |
| A2 | 116 | 95  |
| A3 | 205 | 150 |
| A4 | 161 | 93  |
| A5 | 216 | 235 |
| A6 | 157 | 282 |
| A7 | 127 | 221 |

Each of the avatars may be considered to be a node. It is assumed that each of the nodes is capable of sending 4 streams, and the hearing range of each node is 115.

Step 1 places the avatars in a plane with the same x,y coordinates as they occupy in the virtual world. This is shown in FIG. 2.

Figure 4:
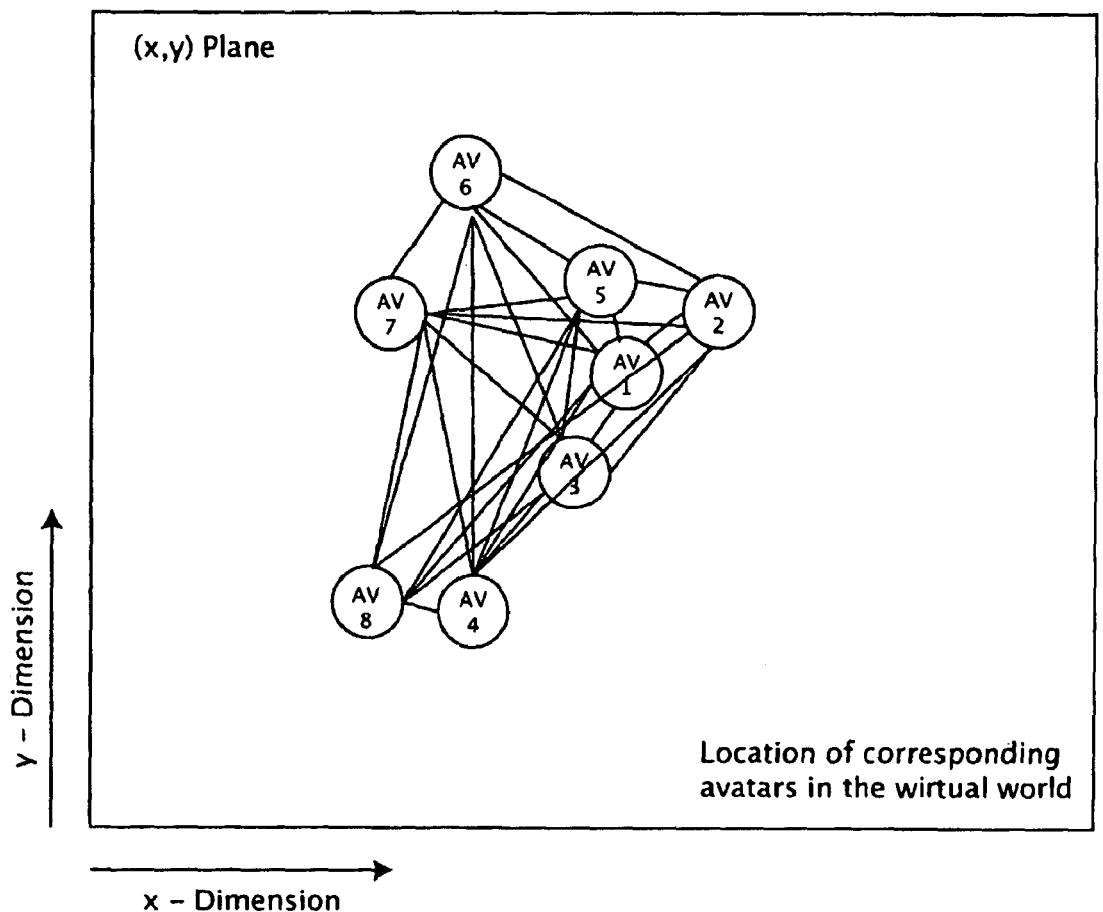
FIG. 4 is an example of a mesh connection linking the avatars in the virtual environment of FIG. 2.

Step 2 creates a mesh connection (i.e. every node is connected to every other node) between the nodes. This step provides an underlying node topology for use by the minimum spanning tree algorithm. The mesh network for this example is shown in FIG. 4.

The distance between each of the avatars is used later in the algorithm and is calculated as the value (matrix) $VD_{ij}$, as shown in Table 2:

TABLE 2

$VD_{ij}$ Calculated Values

| | | | |
|---|---|---|---|
| | VD2,1 = 148 | VD3,1 = 47 | VD4,1 = 119 |
| VD1,2 = 148 | | VD3,2 = 105 | VD4,2 = 45 |
| VD1,3 = 47 | VD2,3 = 105 | | VD4,3 = 72 |
| VD1,4 = 119 | VD2,4 = 45 | VD3,4 = 72 | |
| VD1,5 = 46 | VD2,5 = 172 | VD3,5 = 86 | VD4,5 = 152 |
| VD1,6 = 115 | VD2,6 = 191 | VD3,6 = 140 | VD4,6 = 189 |
| VD1,7 = 105 | VD2,7 = 126 | VD3,7 = 105 | VD4,7 = 132 |
| VD5,1 = 46 | VD6,1 = 115 | VD7,1 = 105 | |
| VD5,2 = 172 | VD6,2 = 191 | VD7,2 = 126 | |
| VD5,3 = 86 | VD6,3 = 140 | VD7,3 = 105 | |
| VD5,4 = 152 | VD6,4 = 189 | VD7,4 = 132 | |
| | VD6,5 = 75 | VD7,5 = 90 | |
| VD5,6 = 75 | | VD7,6 = 68 | |
| VD5,7 = 90 | VD6,7 = 68 | | |

In Step 3, Kruskal's algorithm was used to calculate a minimum spanning tree. Kruskal's algorithm is a common algorithm for calculating minimum spanning trees and well known to telecommunication engineers and graph theory experts.

Figure 5:
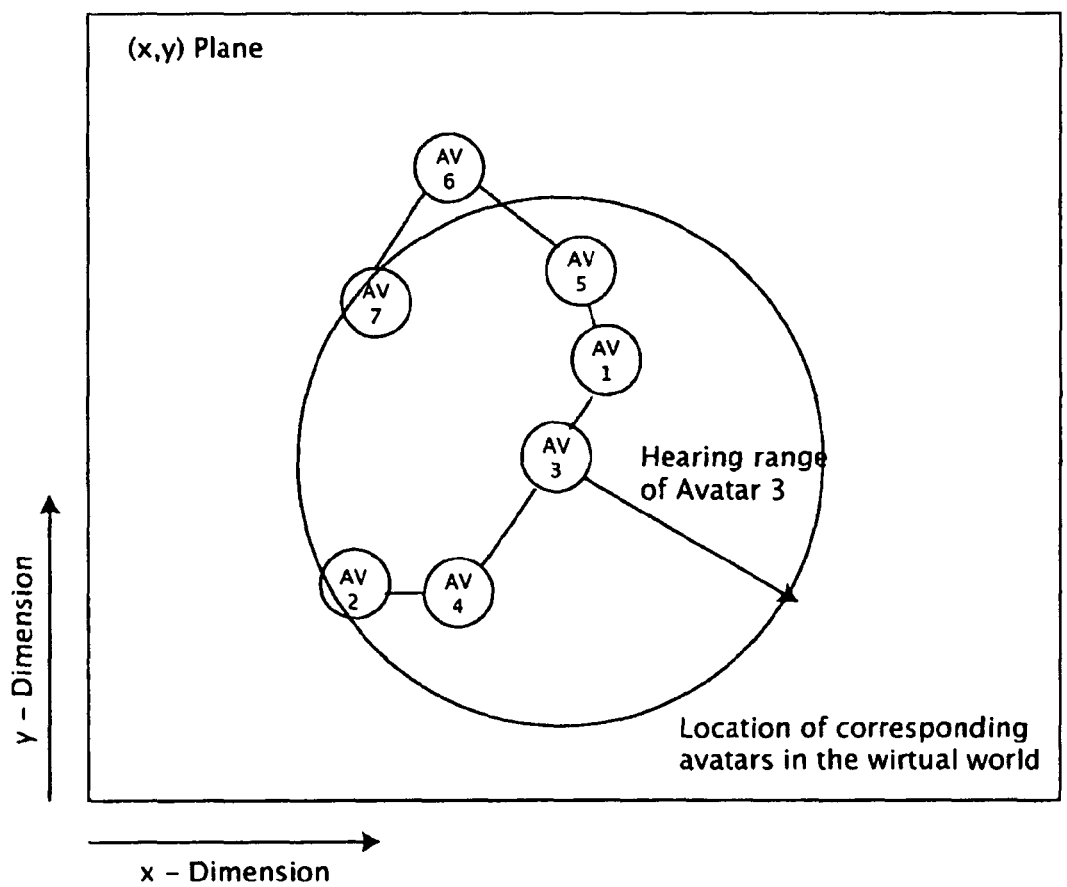
FIG. 5 depicts the application of a minimum spanning tree to determine the shortest linkages between avatars of FIG. 2.

At Step 4, a link that is not part of the minimum spanning tree is removed from the graph. The output of this stage is shown in FIG. 5.

The set of nodes that can "hear" each other are calculated in Step 5:

$$H=[(3,1), (3,5), (3,7), (3,4), (3,2), (2,4), (1,5), (1,6), (1,7), (5,6), (7,6), (7,5)]$$

and the Distance of each graph link, is also calculated as shown in Table 3:

TABLE 3

| Distance Between Each Graph Link | |
|---|---|
| Link 2,4 | 45 |
| Link 4,3 | 72 |
| Link 3,1 | 47 |
| Link 1,5 | 46 |
| Link 5,6 | 75 |
| Link 6,7 | 68 |

Lastly, the shortest path for all elements in H are calculated:

$$SP(3,1)=D(3,1)=47$$

$$SP(3,5)=D(3,1)+D(1,5)=47+46=93$$

$$SP(3,7)=D(3,1)+D(1,5)+D(5,6)+D(6,7)=47+46+75+68=236$$

$$SP(3,4)=D(3,4)=72$$

$$SP(3,2)=D(3,4),D(4,2)=72+45=117$$

$$SP(2,4)=D(2,4)=45$$

$$SP(1,5)=D(1,5)=46$$

$$SP(1,6)=D(1,5)+D(5,6)=46+75=121$$

$$SP(1,7)=D(1,5)+D(5,6)+D(6,7)=46+75+68=189$$

$$SP(5,6)=D(5,6)=75$$

$$SP(7,6)=D(7,6)=68$$

$$SP(7,5)=D(7,6)+D(6,5)=68+75=143$$

$$\text{min\_loop}_{ij}=SP_{ij}+VD_{ij}$$

$$\text{min\_loop}(3,1)=47+47=94$$

$$\text{min\_loop}(3,5)=93+86=179$$

$$\text{min\_loop}(3,7)=236+105=341$$

$$\text{min\_loop}(3,4)=72+72=144$$

$$\text{min\_loop}(3,2)=117+105=222$$

$$\text{min\_loop}(2,4)=45+45=90$$

$$\text{min\_loop}(1,5)=46+46=92$$

$$\text{min\_loop}(1,6)=46+115=181$$

$$\text{min\_loop}(1,7)=189+105=194$$

$$\text{min\_loop}(5,6)=75+75=150$$

$$\text{min\_loop}(7,6)=68+68=136$$

$$\text{min\_loop}(7,5)=143+90=233$$

Then, setting the min_edge_length=infinity, it is found that the min_loop(3,7)>2×hearing_range (230) and VD(3,7)<min_edge_length;

so min_edge_length=VD(3,7)=105 and Min_edge={3,7}.

Furthermore, no other min_loop(i,j)>2×hearing_range exists.

Figure 6:
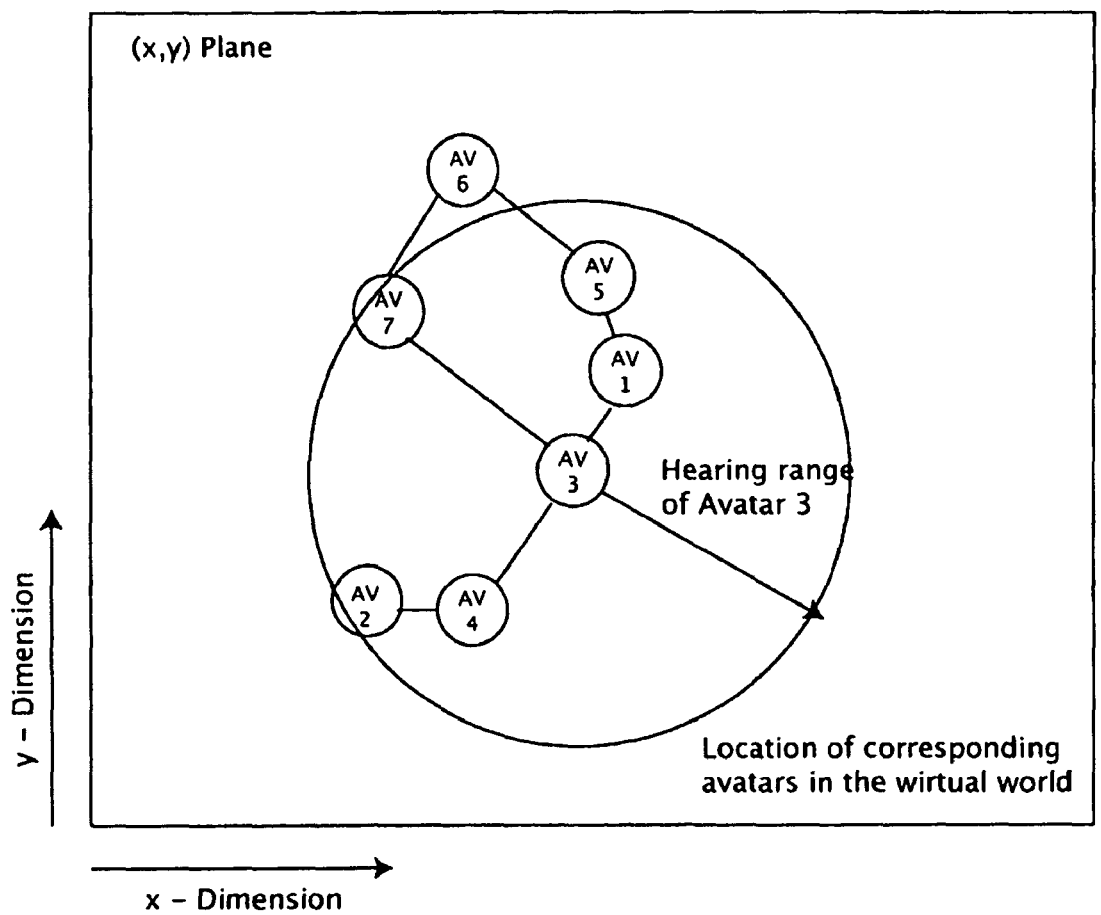
FIG. 6 shows an edge being added to the minimum spanning tree, in accordance with an embodiment of the present invention.

The edge {3,7} is then added to the graph as shown in FIG. 6.

Step 5 is then repeated using the updated graph (the links added by previous iterations of Step 5) until there are no loops left to add.

The next iteration of Step 5 finds that there are no more acceptable loops to add so the algorithm stops with only the addition of link 7,3.

Figure 3:
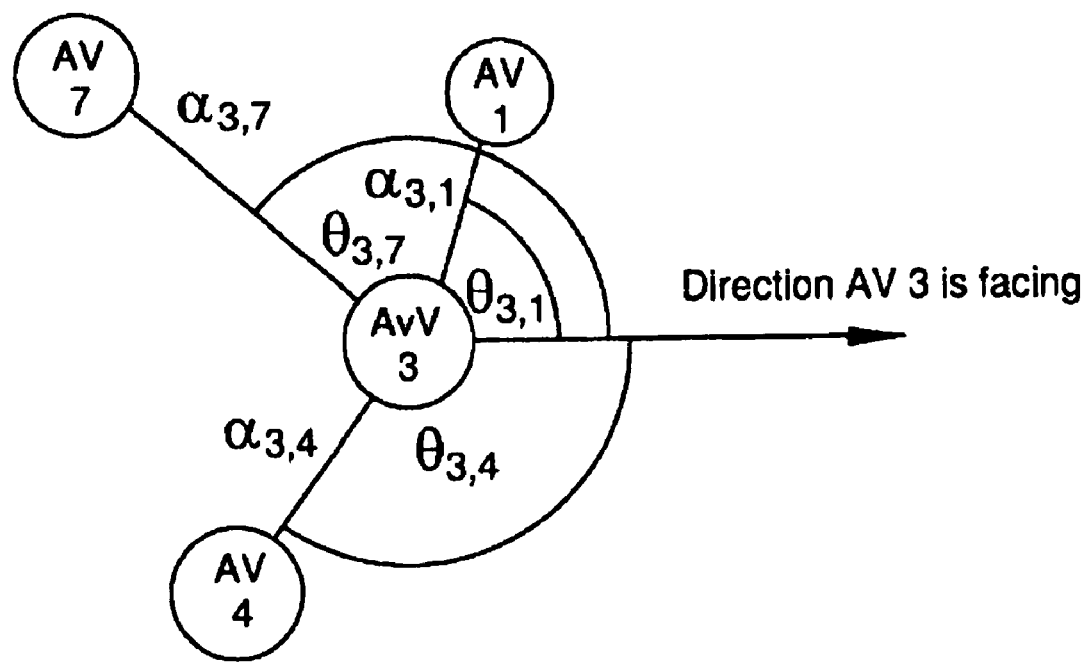
FIG. 3 shows the angles and attenuation levels required for rendering each of the audio streams received by an avatar of the virtual environment of FIG. 2.

With reference to FIG. 3, there is shown a graph denoting the rendering angles and attenuation levels that are required to render incoming audio streams from the perspective of avatar 3. As shown in the preceding figures, avatar 3 will receive audio streams from avatars 1, 7 and 4. The virtual environment client application residing on the user computing device controlling avatar 3 will render the audio scene as follows: audio arriving from avatar 1 will be rendered at angle $\theta_{31}$ to the left of the avatar 3. The audio received from avatar 7 will be rendered $\theta_{37}$ degrees to the left the listener; while audio received from avatar 4 will be rendered $\theta_{34}$ to the right of the listener, as shown in FIG. 6.

The audio streams that are received from avatars 1,7 and 4 are an attenuated mix of all the upstream nodes. For example, the audio stream sent from avatar 1 to avatar 3 is a mix of all audio received upon incoming streams (except on the link 3,1) mixed with the voice of avatar 1, which is recorded locally by the user computing device. These voices are attenuated according to the length of the link the audio is received on. Therefore, the audio stream that is sent on link 3,1 is equal to: the audio stream sent by avatar 2 attenuated by $\alpha_{12}$ mixed with audio sent by avatar 5 attenuated by $\alpha_{15}$ mixed with locally generated voice of Avatar 1.

Since the audio from each avatar is mixed with an attenuated version of the audio received on all incoming links, avatar 3 will effectively hear avatars 1, and 5 emanating from the direction of avatar 1 with varying distances because of the different levels of attenuation. The voice of avatar 6 will influence the audio being heard by avatar 3 from the direction of both avatars 1 and 7. However, if the attenuation levels are set correctly then the volume of avatar 6 will be negligible. It should also be noted that in this example if there were no loops introduced, then avatar 3 would not hear Avatar 7 because the attenuation on the path through 5 and 1 would have been too great.

It will be readily appreciated that even though the embodiment of the present invention has been described in the context of being used to support a virtual environment, the present invention is not restricted to being used with a virtual environment. As such, the present invention could be used to provide an immersive audio system for use as, for example, an audio only conferencing system.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

The claims defining the invention are as follows:

1. A method of creating an audio scene, for an avatar in a virtual environment including a plurality of avatars, the method comprising the step of:
    creating a link structure between the plurality of avatars in the virtual environment;
    rendering an audio scene for each avatar based on its association with other linked avatars, wherein the link structure comprises a tree structure that connects the plurality of avatars, the tree structure comprises a minimum spanning tree, and the method is performed by one or more computing devices; and
    introducing loops to a calculation associated with the minimum spanning tree such that minimum length of the loops is less than a predetermined value.

2. A method of creating an audio scene in accordance with claim 1, wherein the predetermined value comprises twice the hearing range of an avatar.

3. The method of claim 1, comprising the further step of mixing the rendered audio scene with an audio stream generated by at least one of the plurality of avatars.

4. The method of claim 3, comprising the further step of sending the mixed audio scene to another linked avatar.

5. A non-transitory computer readable storage medium comprising at least one instruction for controlling a computer to implement a method in accordance with claim 1.

6. The method of claim 1, wherein the link structure is operable to define at least one of a rendering angle and attenuation factor to apply to audio streams on incoming links.

7. The method of claim 6, wherein an angle of a link between the two avatars in the link structure defines the rendering angle.

8. The method of claim 1, wherein a cost metric is calculated based on a distance between two avatars in the link structure.

9. The method of claim 8, wherein the cost metric defines the attenuation factor.

* * * * *